US012730783B1

(12) United States Patent
Xie et al.

(10) Patent No.: US 12,730,783 B1
(45) Date of Patent: Sep. 8, 2026

(54) CONTENT MANAGEMENT SYSTEM

(71) Applicant: Amazon Technologies, Inc., Seattle, WA (US)

(72) Inventors: Kenny Xie, New York, NY (US); Maan Shamoon, La Messa, CA (US); Amanda Josephine Sambawa, Rancho Santa Fe, CA (US); Joseph David Wolf, Alexandria, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/918,972

(22) Filed: Oct. 17, 2024

(51) Int. Cl.
*G06F 16/21* (2019.01)
*G06F 16/28* (2019.01)

(52) U.S. Cl.
CPC .......... *G06F 16/212* (2019.01); *G06F 16/288* (2019.01)

(58) Field of Classification Search
CPC ............................ G06F 16/212; G06F 16/288
See application file for complete search history.

(56) References Cited

U.S. PATENT DOCUMENTS 7,043,490 B2 * 5/2006 Choy ...................... G06F 16/48 707/999.102
2022/0391363 A1 * 12/2022 Portisch .............. G06F 16/2282

* cited by examiner

*Primary Examiner* — William Spieler
(74) *Attorney, Agent, or Firm* — Eversheds Sutherland (US) LLP

(57) ABSTRACT

A content management system is provided. The content management system (CMS) uses a unique content modeling architecture using nested, reusable data entities, as well as a method for constructing a system around those entities to enable features and automation within the CMS. The solution's novelty lies in (1) a mechanism for efficiently and robustly governing, triggering, and enabling complex processes (e.g., translation workflows, publication workflows) for content within a CMS by dynamically associating system models with the content, and (2) enabling schema consistency and the creation of flexibly typed content via "model set" entities that aggregate one or more reusable content schemas.

16 Claims, 12 Drawing Sheets

500

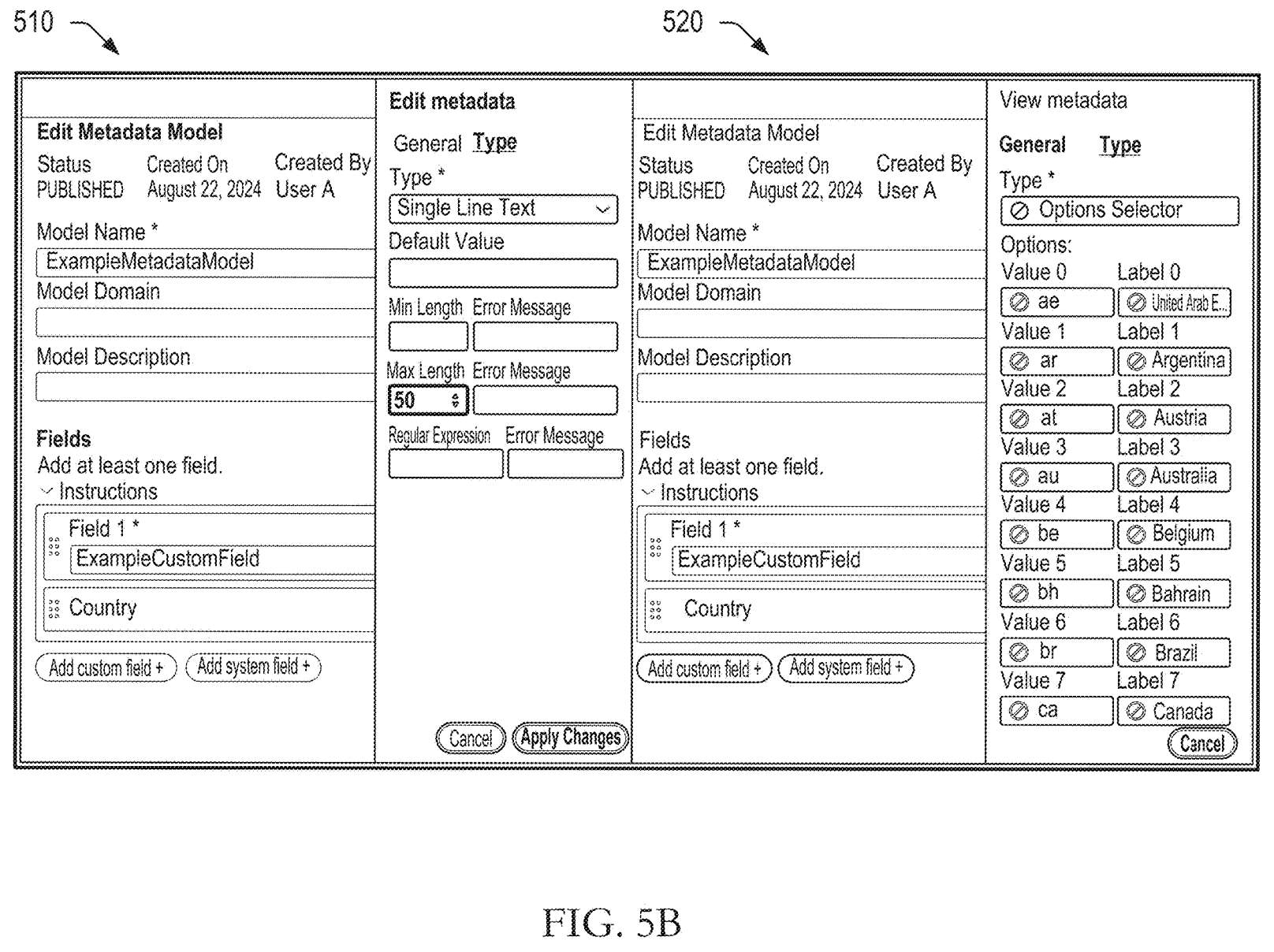

510

Edit Metadata Model
Status PUBLISHED
Created On August 22, 2024
Created By User A
Model Name *
ExampleMetadataModel
Model Domain
Model Description
Fields
Add at least one field.
Instructions
Field 1 *
ExampleCustomField
Country
Add custom field +
Add system field +

Edit metadata
General Type
Type *
Single Line Text
Default Value
Min Length
Error Message
Max Length
50
Error Message
Regular Expression
Error Message
Cancel
Apply Changes

520

Edit Metadata Model
Status PUBLISHED
Created On August 22, 2024
Created By User A
Model Name *
ExampleMetadataModel
Model Domain
Model Description
Fields
Add at least one field.
Instructions
Field 1 *
ExampleCustomField
Country
Add custom field +
Add system field +

View metadata
General Type
Type *
Options Selector
Options:
Value 0 ae Label 0 United Arab E...
Value 1 ar Label 1 Argentina
Value 2 at Label 2 Austria
Value 3 au Label 3 Australia
Value 4 be Label 4 Belgium
Value 5 bh Label 5 Bahrain
Value 6 br Label 6 Brazil
Value 7 ca Label 7 Canada
Cancel

FIG. 5B

CONTENT MANAGEMENT SYSTEM

BACKGROUND

Content Management Systems (CMS) are software platforms designed to facilitate the creation, management, and modification of digital content. They are widely used to manage websites, blogs, and other digital content repositories. A CMS typically provides a user-friendly interface that allows users, even those without technical expertise, to create and manage content with ease. Core functionalities of a CMS include content creation tools, content storage, workflow management, and publishing capabilities. Advanced CMS platforms may also offer features such as version control, metadata management, and support for multiple users and roles.

One example of a CMS may be a platform for creating and managing websites and blogs. Such a platform may offer a user-friendly interface that allows users to create, edit, and publish content without requiring extensive technical knowledge. The platform includes various features such as a visual editor for content creation, media management for images and videos, and a robust plugin architecture that enables users to extend the functionality of their websites.

Another example of a CMS is a platform designed for e-commerce. This exemplary CMS provides a robust platform for users to create, manage, and grow their online stores. The CMS offers a user-friendly interface that allows users to easily set up and customize their online storefronts without requiring extensive technical expertise. The platform includes various features tailored to e-commerce, such as product management, inventory tracking, order processing, and payment gateway integration.

Despite their widespread use, traditional CMS platforms often face challenges related to data redundancy, inconsistency, and scalability, particularly as the volume and complexity of content grow.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may depending on the context, encompass a plural number of such components or elements and vice versa.

FIGS. 5A-5D depict exemplary user interfaces for a content management system, in accordance with one or more example embodiments of the disclosure.

DETAILED DESCRIPTION

This disclosure relates to, among other things, an improved content management system. Existing content management systems often suffer from data redundancy and inconsistency due to inefficient reuse mechanisms for content fields and models. This leads to bloated storage requirements, potential discrepancies in data definitions, and an inability to adhere to the principle of "create once, publish everywhere" (COPE). Managing complex features or workflows within these systems is cumbersome and error-prone, requiring manual configuration for each content type, increasing the risk of misconfigurations, and making maintenance labor-intensive. As demand for dynamic and feature-rich content grows, these systems struggle to adapt without extensive manual overhauls. Scalability issues also arise as content volume and diversity increase, exacerbating performance and management difficulties.

Specifically, in traditional content management systems, schemas are defined uniquely for each content type (e.g., articles, blog posts, policy documents, or any other types of content), leading to redundancy and inconsistency. Similar fields are repeatedly defined across multiple schemas with different constraints or data types. Maintenance becomes challenging as updating a field requires changes in every schema where it appears. The lack of a modular approach limits flexibility, making it difficult to add and enable new features or processes, like translation workflows, without significant manual effort and schema modifications. These challenges highlight the need for a more efficient, scalable, and maintainable approach to content modeling and feature enablement in content management systems.

An improved content management system is described herein that mitigates these downsides of conventional content management systems. The improved content management system includes a content modeling architecture using nested, reusable data entities and a method for constructing a system around those entities to enable features and automation within the content management system. The content management system includes a mechanism for efficiently and robustly governing, triggering, and enabling complex processes (e.g., translation workflows, publication workflows) for content within the content management system by dynamically associating system models with the content. The improved content management system also enables schema consistency and the creation of flexibly typed content via "model set" entities that aggregate one or more reusable content schemas.

Figure 1:
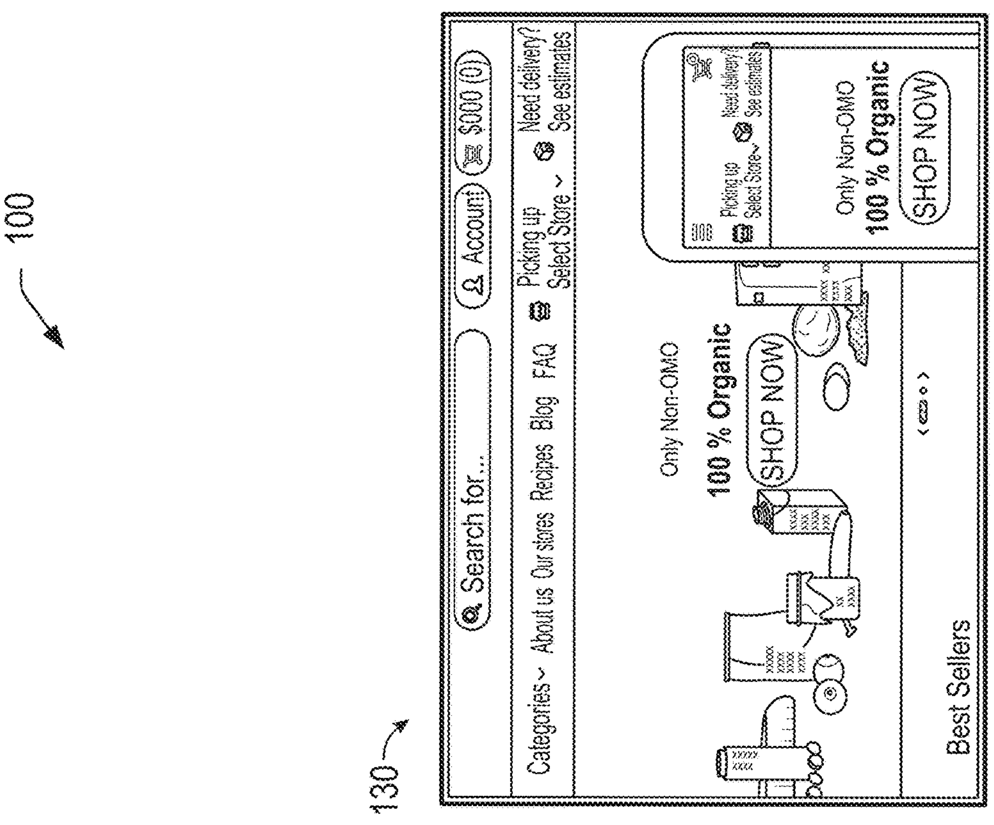
FIG. 1 depicts an exemplary use case for a content management system, in accordance with one or more example embodiments of the disclosure.
Figure 1:
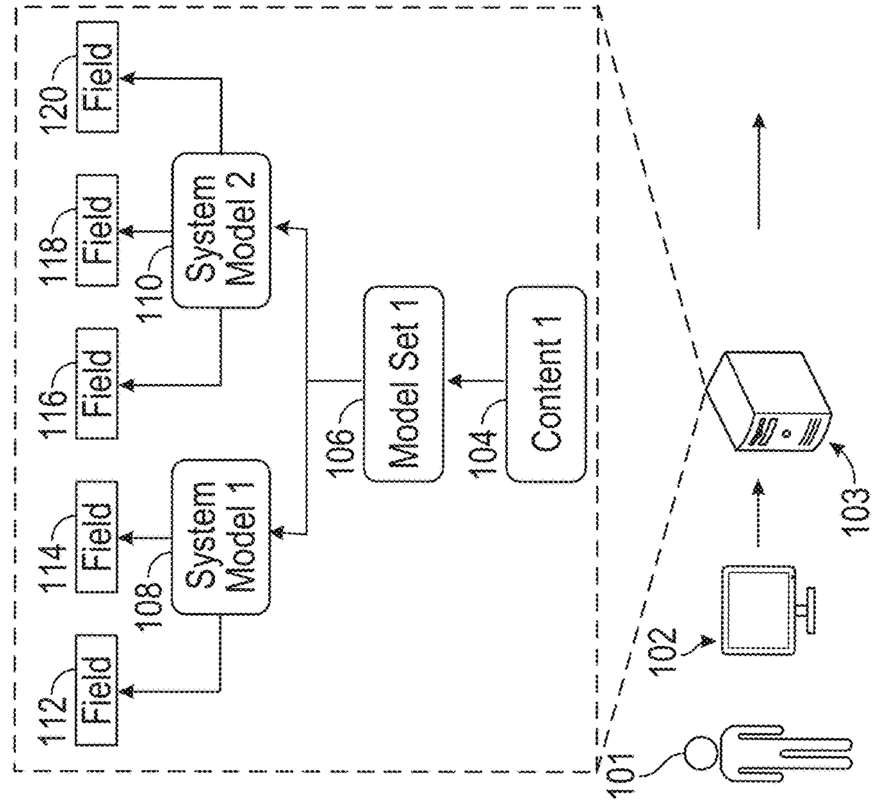

Turning to the figures, FIG. 1 depicts exemplary use case 100 for a content management system 103. The use case 100 is merely intended to illustrate the high-level operation of the content management system 103 and is not intended to be limiting in any way.

Figure 7:
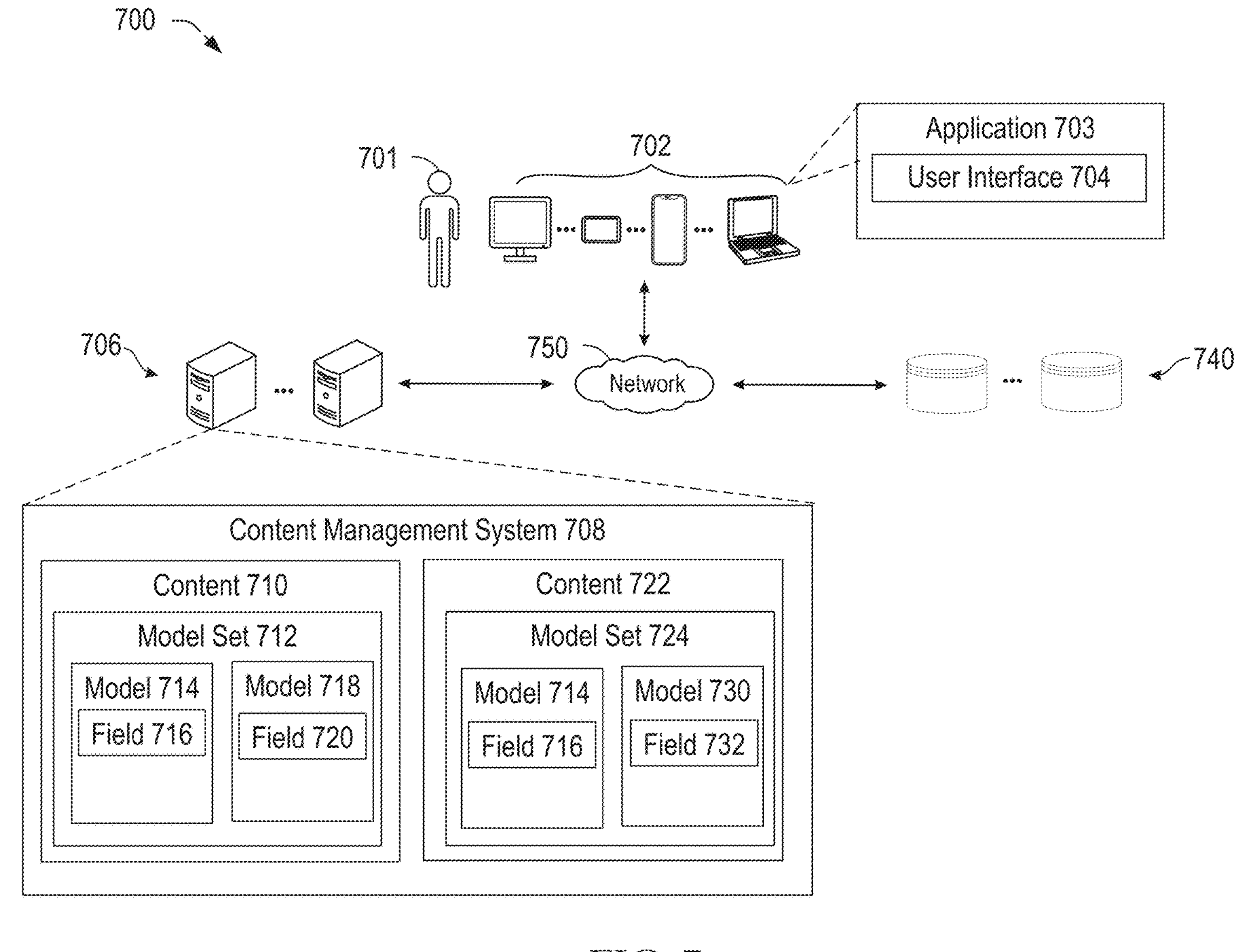
FIG. 7 depicts another exemplary system for a content management system, in accordance with one or more example embodiments of the disclosure.

The use case 100 shows user 101 interacting with a user device 102 (which may be the same as, or similar to, user device 702 shown in FIG. 7). The user device 102 may be any type of device, such as an e-reader, personal assistant device, speaker, gaming console, smartphone, desktop computer, laptop computer, tablet, smart television (for example, a television with Internet connectivity, the capability to install applications, etc.), and/or any other type of device.

The user device 102 may include an application (which may be the same as, or similar to, application 703 of FIG. 7) that allows the user 101 to interact with a "frontend" (user-facing) element of the content management system 103. For example, the user 101 may be an owner of a website that is created and published using the content management system 103. In this example, the website is an online retail website (shown as website 130) that allows other users to view and purchase products listed for sale on the website by the user 101.

The content management system 103 is shown as including various elements that may be used to generate the exemplary website 130. For example, the content management system 103 is shown as including content 104 which is associated with a model set 106. The model set 106 includes a first model 108 and a second model 110. Each of the models includes one or more fields (for example, the first model 108 is shown as including first field 112 and second field 114 and the second model 110 is shown as including third field 116, fourth field 118, and fifth field 120). Further details about these various elements are provided with respect to at least FIGS. 2-4. Any of these elements may be initially generated by the user 101, may be previously-generated by another user and re-used by the user 101, and/or may be automatically generated by a system, such as the content management system 103 itself.

To create content to be published via the content management system 103 for other users to interact with, the user 101 may generate a model set using any of the models of the content management system 103 (or may initially create the models that form the model set). The models may define certain functionality of the content once published by the content management system 103. As an example (described in further detail below), the content may be a blog that is maintained by the user 101. A model may be constructed that includes fields like "Title," "Date," and "Author". Another model may be constructed to include fields like "Body" and "Summary". The user 701 may create a model set including these models and the models may then dictate how certain content is published on the blog using the content management system 103.

Once the fields and models are generated, the fields and models may then be stored within the content management system 103 such that other users may generate other content to be published via the content management system 103 using the same fields and models. For example, a second user (not shown in the figure) can generate another online retail website using the models and fields generated by the first user. That is, the second user can generate another model set including the first model 108 and/or the second model 110 (and/or any other models). The same user 101 may also re-use the previously-generated fields and models to publish other content as well.

Figure 2A:
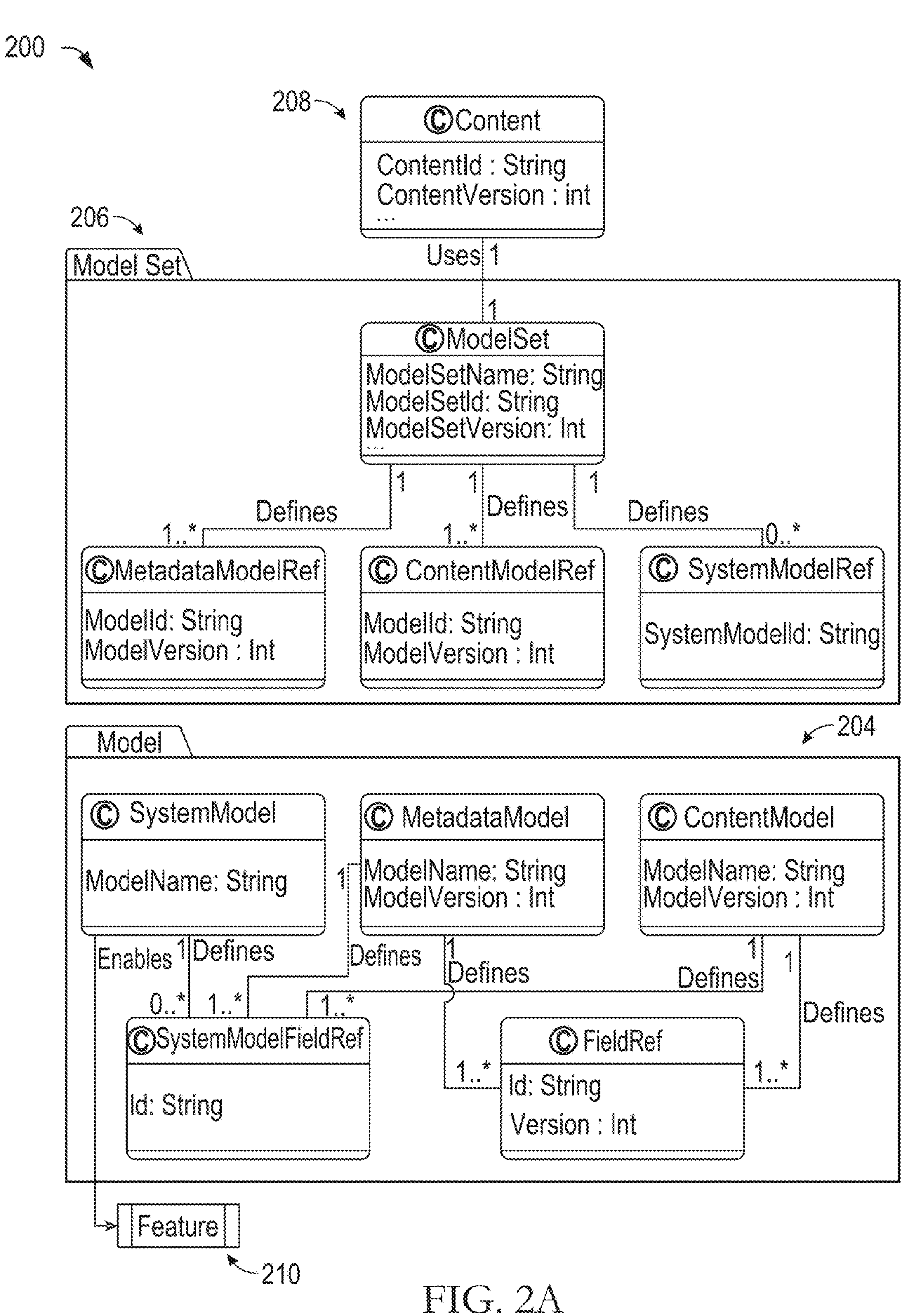
FIGS. 2A-2B depict an exemplary model architecture for a content management system, in accordance with one or more example embodiments of the disclosure.
Figure 2B:
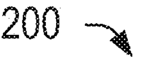
Figure 2B:
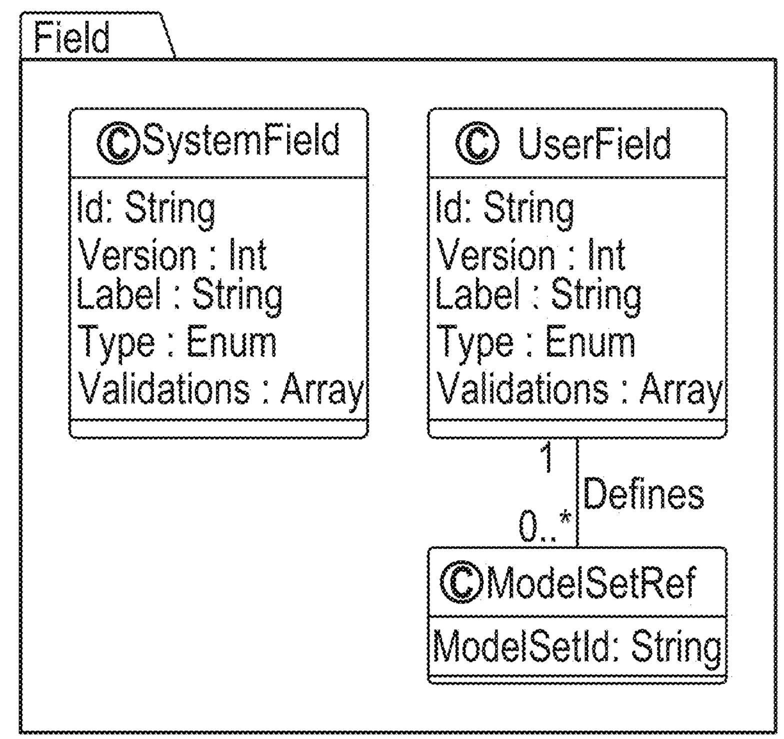

FIGS. 2A-2B depict an exemplary model architecture 200 for the improved content management system described herein. Particularly, the model architecture 200 illustrates some of the individual elements that serve as a foundation for the improved content management system. In embodiments, the model architecture 200 may include at least fields 202, models 204, model sets 206, content 208, and feature 210.

At the smallest unit, fields 202 (shown in FIG. 2B) may be used to define the properties of other data elements (such as models, etc.). Fields may include, for example, details such as identifiers, version numbers, labels, data types (number, string, rich text, etc.), minimum and maximum length of the field, validations, etc. An identifier may be used to identify one field relative to another field. The identifiers may be provided in any suitable format, such as a string, numerical value, combination of the two, etc. Version numbers may be used to indicate different versions of the same type of field. Fields may have new versions created whenever there is a field authored that has the same identifier, but different type and/or validations (further details about versioning are provided with respect to at least FIG. 4). Validations may refer to conditions that may be required for certain types of fields. For example, a maximum character limit of 50 characters may be imposed on a particular type of field. As another example, another type of field may require only numerical values. Fields may be defined by the system or by users at runtime (runtime may refer to the instance in which the user is interacting with the content management system, for example). Any other types of information may be associated with a field as well.

A model 204 aggregates various user and system-defined fields. For example, a user may generate a model and indicate a collection of fields to associate with the model (as shown in FIGS. 5A-5D). In other instances, certain types of models may be pre-established within the content management system and each of the types of models may be associated with certain pre-determined fields. Non-limiting examples of models and fields included in the models are provided below with respect to Table 1 and the accompanying description.

There may exist various different types of models that may be generated. For example, FIGS. 2A-2B show three different types of exemplary models 204, including: metadata models, content models, and system models. Metadata models may include a collection of fields that define properties and attributes associated with content (non-limiting examples of content include a news article, a frequently-asked questions (FAQ) page, a description of a building, a legal policy document, and/or any other types of content that may be published). Content models may define fields that are user-readable within the content. System models encapsulate system defined fields that are associated with processes, such as translations or publication workflows within the content management system (this is elaborated on in more detail later). These system models may be referenced by system model identifiers.

A model set 206 is an element that aggregates one or more models 204 into a single comprehensive schema for specific content types. Models 204 may be referenced and reusable across model sets 206. Content 208 defining fields may be created using these model sets 206. A type of field entity 202, which may be called a "content reference" field type, may be created by defining a reference to a model set 206. Content 208 can use this field type to reference other types of content using the same or different model sets 206. Collectively, the combination of model sets 206 and system models enables a system where users can create flexibly typed content and dynamically enable processes within that system for both new and existing content.

In embodiments, the procedure for modeling content may involve the following, for example. First, system fields may be defined. For example, system fields essential for specific features or processes within the content management system may be defined. These fields ensure that standardized functionalities are available across all content types. These fields may be referenced by and reused across models 204.

Following system field creation, system models may be created. Using the defined system fields, system models may then be created that encapsulate these features. For instance, a localization system model might include fields, such as "Locale" and "Translation Note". In this example, "Locale" may define the locale field and validation regex that validates the value in a list of locates (e.g., English, French, German, etc.). The "Translation Note" defines a string field where a user can define a note to provide context for content to translate. These models may be reused across different content types to enable specific content management system capabilities.

Once the system models are created, metadata models and content models may be constructed. The metadata models capture the properties and attributes relevant to specific content types. For example, a BaseMetadata model may be constructed to include fields like "Title," "Date," and "Author" intended to be reused across multiple model sets for different content types. The content models define the actual fields pertaining to user-readable content. For example, a BaseArticle model may be constructed to include fields like "Body" and "Summary," which can be reused across multiple model sets. Content models can define fields that reference other model sets.

Once the models are created, the model sets may then be constructed using the different models. The model sets may be constructed by referencing the previously defined metadata models, content models, and/or system models (or any other types of models). For instance, a Policy Article ModelSet might include references to BaseMetadata and BaseArticle which reference common Article fields and also include a specific Policy Metadata model that references fields like PolicyNumber, Department and EffectiveDate. It might also include a system model "approval" which enables the model set for a legal approval workflow feature within the content management system.

Table 1 (shown below) details a specific example of the structure and relationship of two model sets, StandardArticle and PolicyArticle. Each model set includes various metadata models and content models. For example, the StandardArticle model set may include BaseMetadata and the system model localization, paired with the content model BaseContent. The Policy Article model set includes additional models, such as the system model approval and the content model PolicyContent. The models are further detailed, with BaseMetadata and PolicyMetadata listing specific fields like Title, Date, and PolicyId, while system models like localization and approval contain fields such as Locale, TargetLocales, legalApprover, and businessReviewer. Field definitions include versions and descriptions, explaining their role, such as Title for the content title and EffectiveDate for policy implementation dates.

Model Sets

| Model Set Name | Version | Metadata Models | Content Models |
|---|---|---|---|
| StandardArticle | 1 | BaseMetadata (v1), localization | BaseContent (v1) |
| Policy Article | 1 | BaseMetadata (v1), localization, approval | BaseContent, PolicyContent (v1) |

Models

| Model Name | Type | Version | Fields |
|---|---|---|---|
| BaseMetadata | Metadata Model | 1 | Title, Date, Author, Owner |
| BaseContent | Content Model | 1 | Body, Summary |
| PolicyMetadata | MetadataModel | 1 | PolicyId, Department, EffectiveDate |
| localization | System Model | N/A | Locale, TargetLocales |
| approval | System Model | N/A | legal Approver, businessReviewer |
| PolicyContent | Content Model | 1 | Policy, Disclaimer |

TABLE 1

Example model set structures
Fields

| Field Name | Field Version | Description | Validations |
|---|---|---|---|
| Title | 1 | Title of the content | [maxLen(50)] |
| Author | 1 | Author of the content | |
| Owner | 1 | Owner of the content | |
| Date | 1 | Date the content was created | |
| Body | 1 | Rich text field | |
| Locale | 1 | Locale information | |
| TargetLocales | 1 | Target locales for translation | [maxArrayLen(20)] |
| Content | 1 | Main content body | |
| Summary | 1 | Summary of the content | |
| PolicyId | 1 | ID of the policy | |
| Department | 1 | Department the policy belongs to | |
| EffectiveDate | 1 | The effective date of the policy | |
| Policy | 1 | The legal content of the policy | [regex( . . . )] |
| Disclaimer | 1 | Legal disclaimer | |
| legal Approver | 1 | Legal approver for approval workflow feature | |
| businessReviewer | 1 | Business reviewer for approval workflow feature | |

Figure 3:
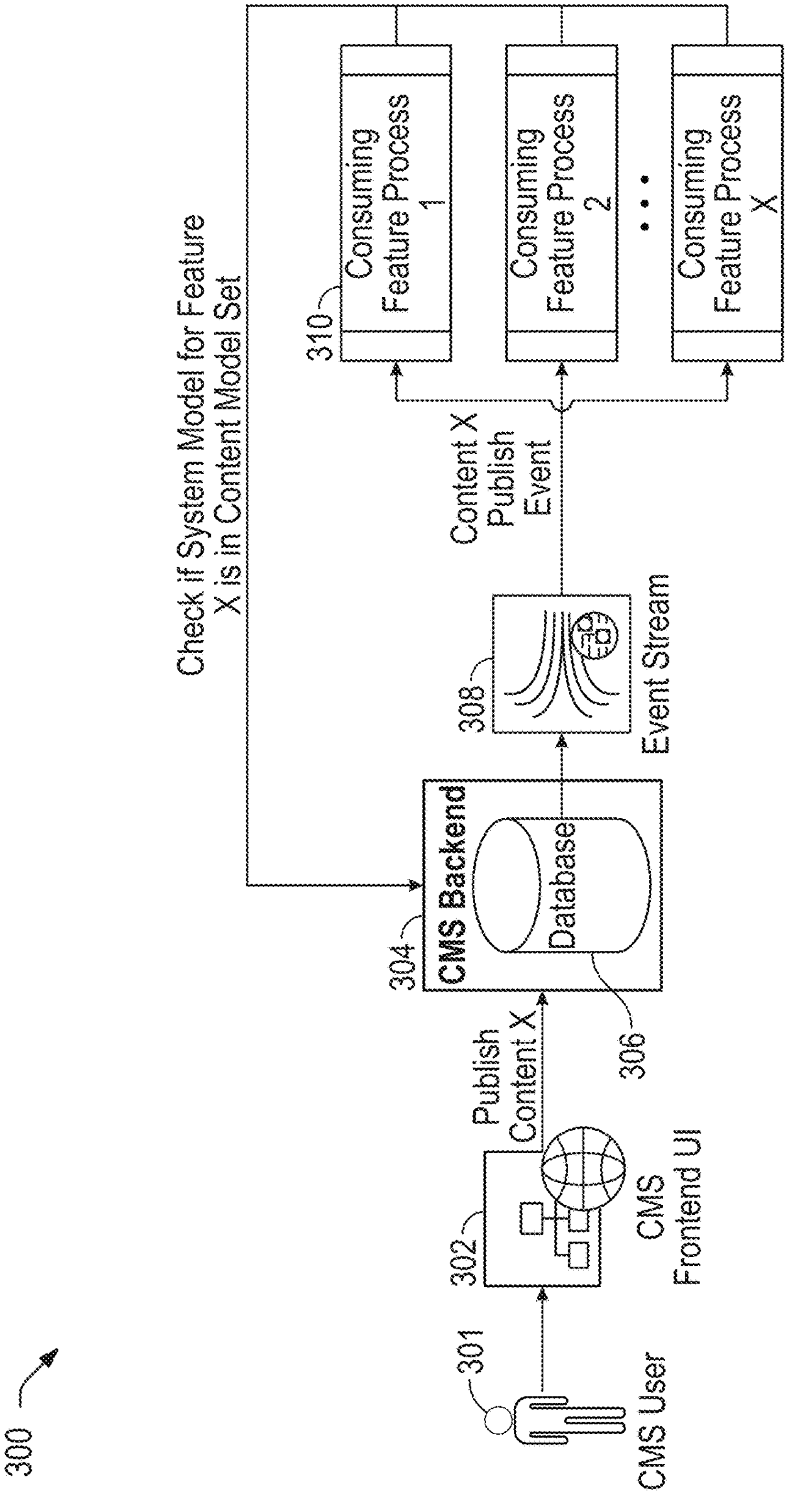
FIG. 3 depicts a flow diagram for automated feature enablement and workflow automation, in accordance with one or more example embodiments of the disclosure.

FIG. 3 depicts a flow diagram 300 for automated feature enablement and workflow automation. The flow diagram 300 illustrates the feature enablement and automation process within a simplified microservice-based architecture for the improved content management system. The example pertains to a content model set definition and subsequent content publication and processing system. The flow diagram 300 begins with a user 301 creating a model set with any number of system models through a frontend user interface 302 (exemplary user interfaces are shown in FIGS. 5A-5D). The model set may also automatically be created by a system, rather than being created by the user 301. The frontend user interface 302 communicates with a CMS backend 304, which in turn interfaces with a database 306 to store and retrieve content and model set information. Once the content is published, the event corresponding to the content publication is generated and sent to an event stream process 308, which acts as a message broker. A consuming feature process 310 checks if the specific feature for the content is included in the content model set to ensure only relevant and enabled features are activated for the published content.

Processes for feature workflows are consumed from the event stream 308. Each of these processes represents a specific feature or functionality tied to a system model that can be applied to the content and they operate independently of each other. New features (event processors) can be added or modified without disrupting the overall system and are activated by defining and associating a system model with a content's model set. The publication action in this case acts as a trigger for any number of downstream workflows. The system is flexible as any model can use a system model field, but is also robust in terms of validation since it may only enable features for content that have the respective system models in their model sets.

Figure 4:
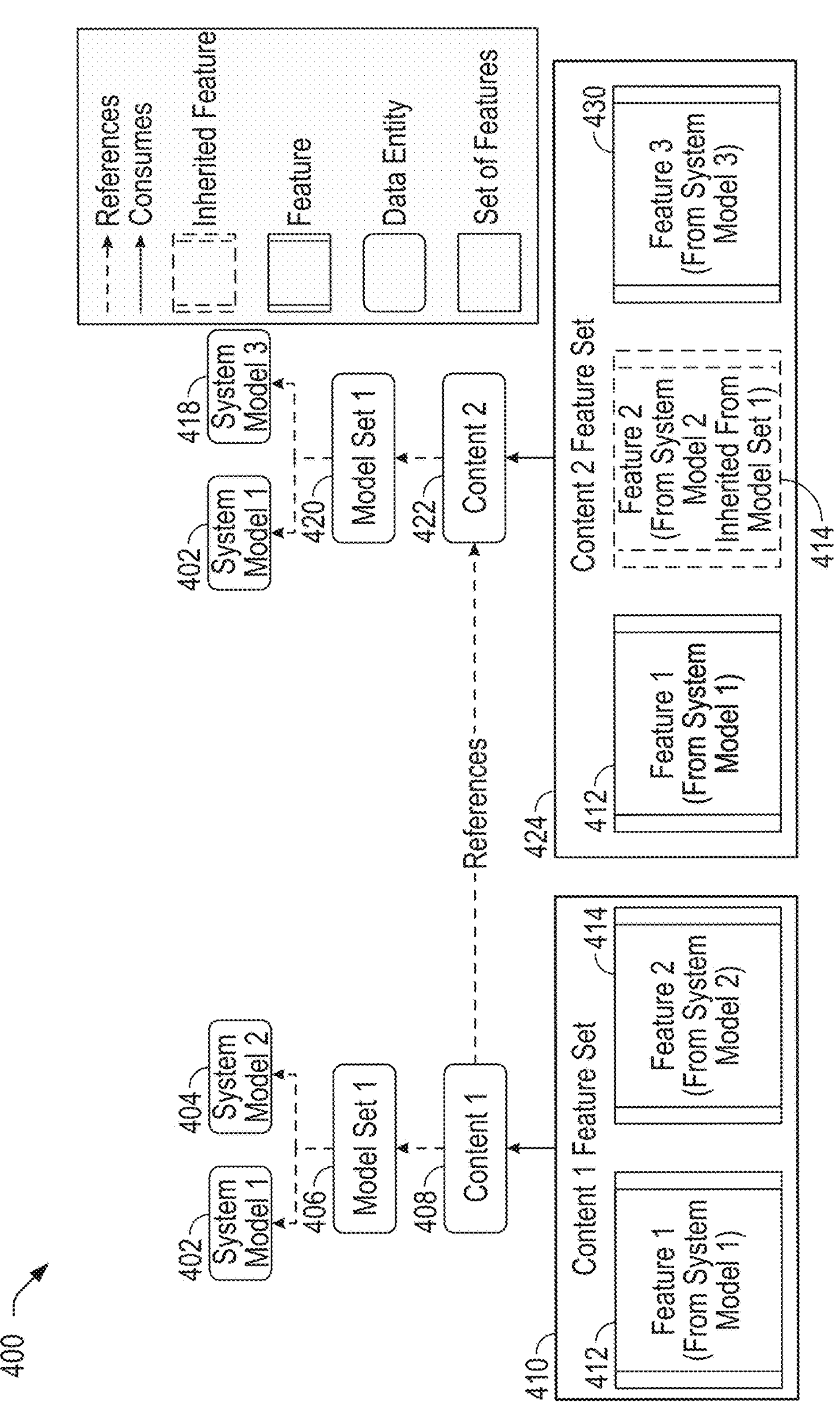
FIG. 4 depicts feature inheritance, in accordance with one or more example embodiments of the disclosure.

FIG. 4 depicts feature inheritance 400. In the model architecture associated with the improved content management system (for example, as shown in FIGS. 2A-2B), fields within models can be defined to reference other pieces of content, allowing for feature inheritance and dynamic updates. For instance, an FAQ model set might include a model with a field defined as a list of references to Q&A content pieces. An author might create parent FAQ content that references other individual Q&A content instances. If the parent FAQ fragment has a 'localization' system model and is enabled for the translation workflow feature, all of the FAQ content instances being referenced may inherit this system model and feature.

FIG. 4 illustrates a simple scenario in which there are two model sets (for example, a first model set 406 and a second model set 420) and one content instance (for example, first content 408 that references the first model set 406 and second content 422 that references the second model set 420).

The first model set 406 includes a first system model 402 and a second system model 404. The first content 408 is associated with a first feature set 410 including a first feature 412 (which may be associated with the first system model 402) and a second feature 414 (which may be associated with the second system model 404).

The second model set 420 includes the first system model 402 and a third system model 418. The second content 422 is associated with a second feature set 424 including the first feature 412 and a third feature 430 (which may be associated with the third system model 418). Additionally, the first content 408 for the first model set 406 references the second content 422 for the second model set 420, and thus the first content 408 inherits the second feature 414 from the second system model 404. This can be extended to any number of system models, any number of content instances and any layers of nesting. If there was a third content that was referenced by the second content 422, then the third content would also inherit all of the first system model 402, second system model 404, and third system model 418, and corresponding features.

Additionally, another type of reference may be defined as a "field reference" that allows content instances to reference specific fields within another content instance. For example, a "rich text editor" field in one content instance might be templatized and reference a "sentence" field in another piece of content. When references are updated, these changes are automatically reflected wherever the fields are referenced ensuring consistency and reducing manual updates.

In embodiments, versioning may also be used with any of the entities shown in FIGS. 2A-2B. Content, model sets, models, and fields may all be versioned in the system. In some instances, a key-based storage system (e.g., a database) that stores definitions for all of these node types may be used. The storage system uses partition keys and sort keys to organize its data; in one configuration, each node can have a unique partition key identifier and a sort key that corresponds to the content version. Each node may have a principal key defined as the default version that other nodes can point to. For instance, content can point to a specific model set and model set version or point to the principal version to always stay up to date with the principal model set definition—essentially, referencing the principal version means using the latest version. Nodes may also have a globalState sortKey. This may include a set of system defined fields that apply to all content across all versions. For example, a system can have a "read-restricted" flag that's a global state property. If enabled for a content identifier, all versions may become read restricted. This provides the flexibility of modifying and maintaining content while also providing rigidity for properties that should not be configured for each content version.

TABLE 2

Versioning implementation in key-value based database

| nodeId | sortKey | status | . . . fields |
|---|---|---|---|
| pk1 | global State | | . . . |
| pk1 | principal | | . . . |
| pk1 | 0 | DRAFT | . . . |
| pk 1 | 1 | DRAFT | . . . |
| pk1 | 2 | PUBLISHED | . . . |

In Table 2, we show the structure of a node stored in a key-value based data store with a partitionKey and sortKey index defined. In this example, pk1 is PUBLISHED and has been designated as the principal version. When a new version is published or an older version is republished, the principal version may be updated as part of an atomic transaction.

Fields have new versions created whenever there is a field authored that has the same ID, but different type and/or validations. For example, there may be a field defined with 'body' that is RTE type with a max length 500 validation and another field defined 'body' in a different model that is a single-line type with a maximum length of 50. They'd be stored and referenced in the system as body (nodeId) version 0 and body version 1.

Figure 5A:
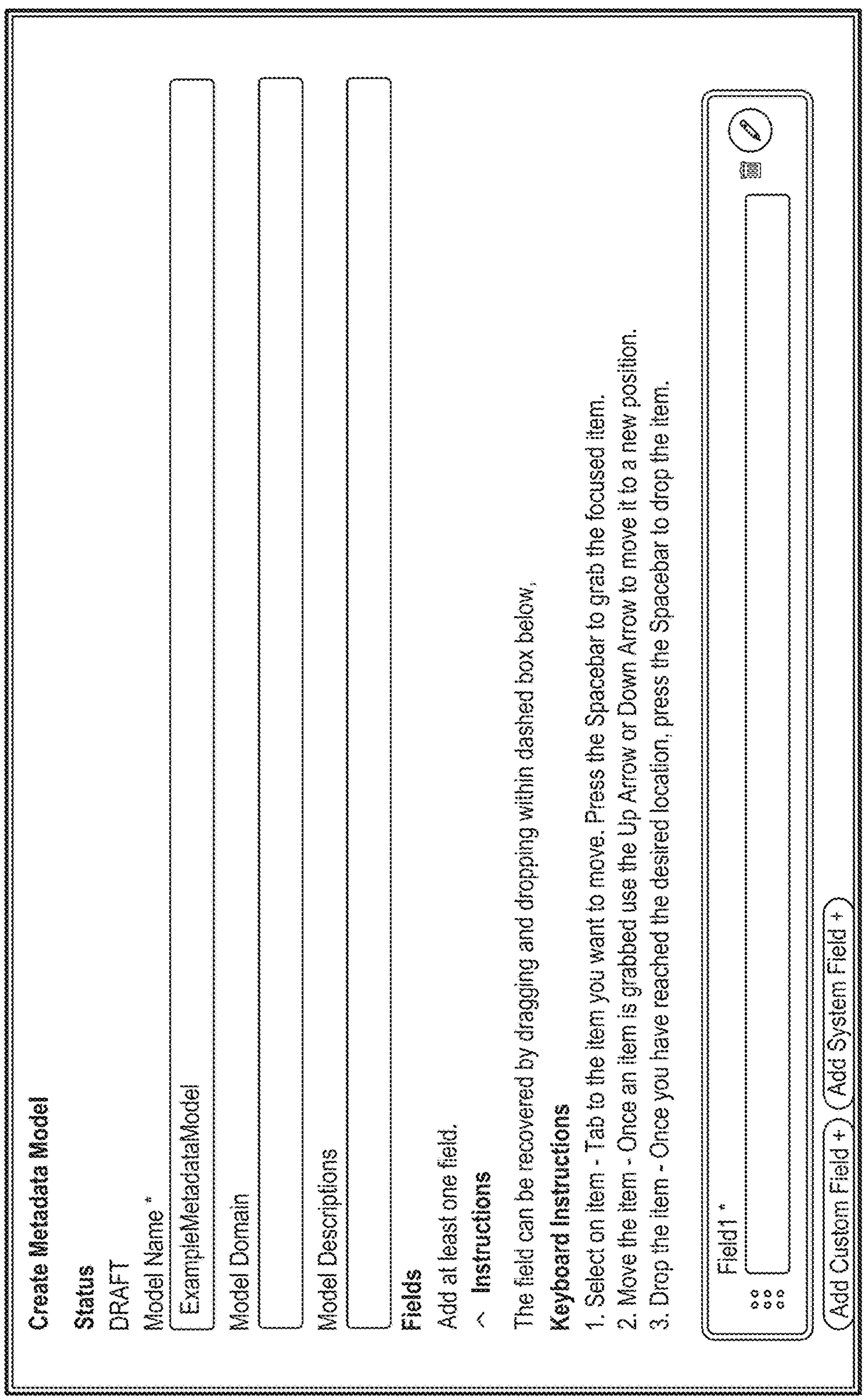
Figure 5C:
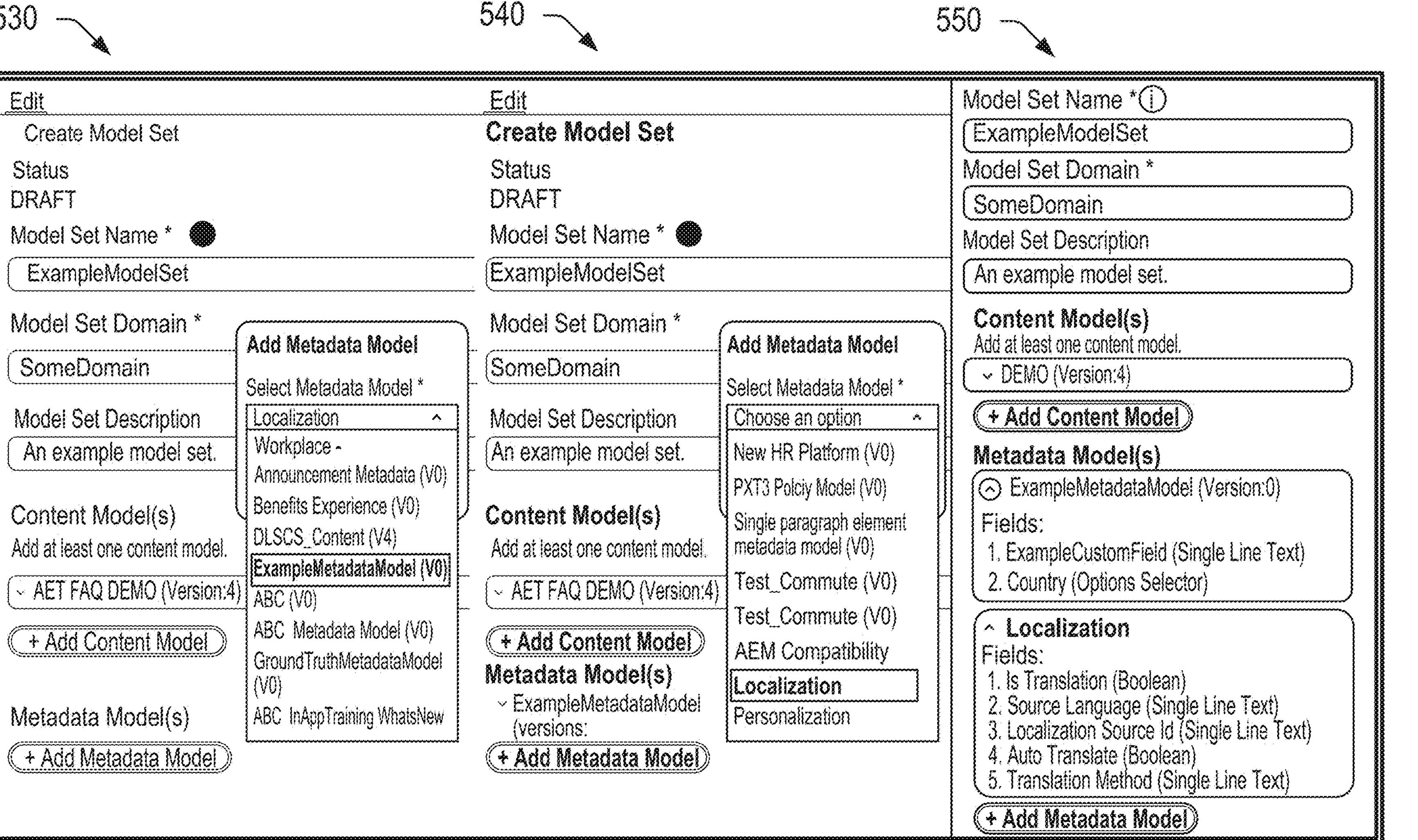

FIGS. 5A-5D depict exemplary user interfaces (for example user interfaces 500-570) for a content management system. The user interfaces shown in FIGS. 5A-5C are not intended to be limiting in any way but are merely intended to illustrate exemplary user interfaces of the improved content management system as described herein. Any of the aspects of the content management system may also be presented in other ways.

Beginning with FIG. 5A, a user interface 500 is shown for the creation of custom models. For example, the user interface 500 allows for a name to be provided for the model and for fields for the model to be generated. In this specific example, a creation page for a metadata model is shown, however, any other type of model (for example, content model, system model, etc.) described herein or otherwise may also be generated).

FIG. 5B shows two additional user interfaces 510 and 520 for editing a model, such as the model created via the user interface 500 of FIG. 5A. As is shown in FIG. 5B, two fields have been added for the metadata model. As shown in the user interface 510, the first field is a custom field named "ExampleCustomField" of type "Single Line Text" and a validation of max length 50. As shown in the user interface 520, the second field is a predefined system field named "Country" of type "Options Selector" with a list of country options to choose from. When this model is created, "ExampleCustomField" is stored in a database with fieldId, version and metadata and the model itself is stored with an identifier and references to both of these fields. If another user were to define another field called "ExampleCustom-Field" but with a different type and validation, then this would be stored as a different version of the model. Both the field and model can be referenced and reused for other content created by other users via the content management system.

FIG. 5C shows additional user interfaces 530-550 for creation of a model set using multiple models (which may include the model that was created as shown in FIGS. 5A-5B). During creation of the model set, information such as the name of the model set, the domain of the model set, and a description for the model set may also be provided (as well as any other information that may be used in associated with the model set). In user interface 530, the "ExampleMetadataModel" generated as shown in FIGS. 5A-5B is selected, in the user interface 540, a "Localization" system model that is predefined by the system is selected, and in the user interface 550, the fields in both metadata models are shown. The localization system model enables any content authored using this model set to be localized and contains fields that are specific to the localization workflow which is system defined.

Figure 5D:
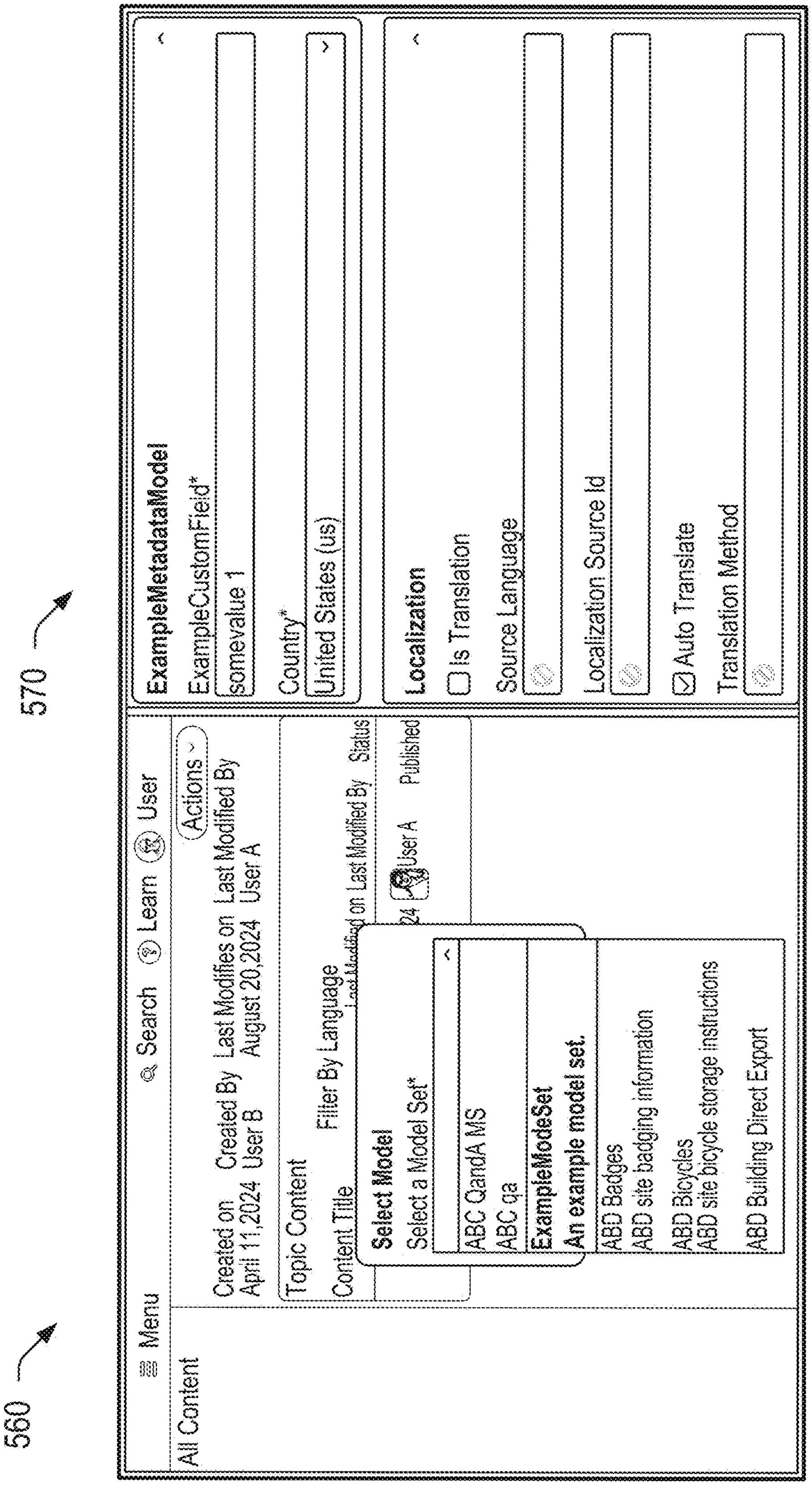

Finally, FIG. 5D shows a user interfaces 560 and 570 for creating content using any of the previously generated model sets. When a user is ready to author content, the user may select (for example, via user interface 560) a model set to associate with their content. Specifically, a selection of the "ExampleModelSet" created in the FIG. 5C is shown. In the user interface 570, the content is created and the properties for the fields in ExampleMetadataModel are defined. For example, for the localization system model, an indication is provided via the user interface 570 that information should be auto-translated following publication. Given that the model set of this content contains the localization system model and the user has checked auto-translate, the system validates eligibility for localization and trigger a localization workflow for this content as soon as it is published. For context, the localization workflow then translates the content to multiple languages and initiates an approval workflow for quality assurance.

Figure 6:
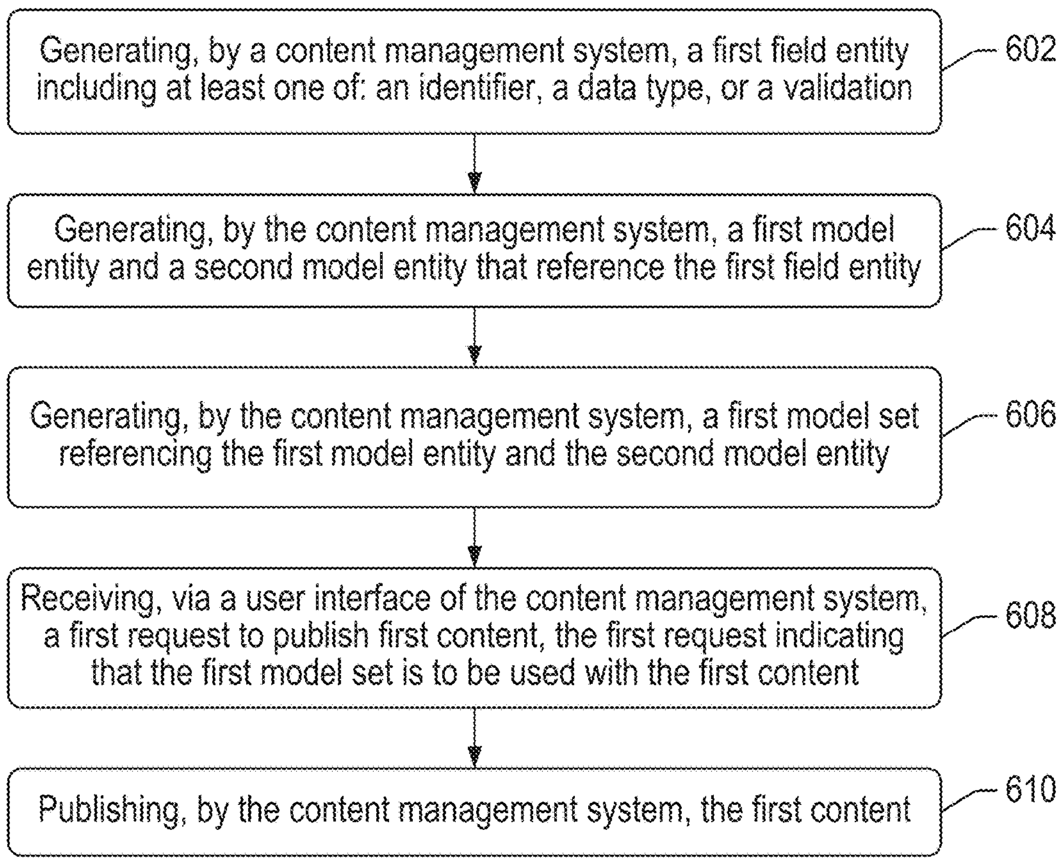
FIG. 6 depicts an exemplary method for a content management system, in accordance with one or more example embodiments of the disclosure.

FIG. 6 depicts an example method 600 for a content management system. Some or all of the blocks of the process flows or methods in this disclosure may be performed in a distributed manner across any number of devices or systems (for example, user device 702 computing systems 706, database 740, etc.). The operations of the method 600 may be optional and may be performed in a different order.

At block 602 of the method 600, computer-executable instructions stored on a memory of a system or device may be executed to generate, by a content management system (for example, content management system 708 or any other content management system described herein), a first field entity (for example, field entity 202, first field 716, second field 720, third field 732, etc.) including at least one of: an identifier, a data type, or a validation.

At block 604 of the method 600, computer-executable instructions stored on a memory of a system or device may be executed to generate, by the content management system, a first model entity (for example, model entity 204, first model 402, second model 404, third model 418, first model 714, second model 718, third model 730, etc.) and a second model entity that reference the first field entity.

At block 606 of the method 600, computer-executable instructions stored on a memory of a system or device may be executed to generate, by the content management system, a first model set (for example, model set entity 206, first model set 406, second model set 420, first model set 712, second model set 724, etc.) referencing the first model entity and the second model entity.

At block 608 of the method 600, computer-executable instructions stored on a memory of a system or device may be executed to receive, via a user interface of the content management system, a first request to publish first content (for example, content 208, first content 408, second content 422, first content 710, second content 722, etc.), the first request indicating that the first model set is to be used with the first content.

At block 610 of the method 600, computer-executable instructions stored on a memory of a system or device may be executed to publish, by the content management system, the first content. Once the content is published by the content management system, the content may then be viewed by a user via a user interface FIG. 7 is an example system 700 including the improved content management system as described herein. In one or more embodiments, the system 700 may include one or more user devices 702 (which may be associated with one or more users 701), one or more computing systems (for example, computing systems 706, etc.), and/or one or more databases 740. However, these components of the system 700 are merely exemplary and are not intended to be limiting in any way. For simplicity, reference may be made hereinafter to, user device 702, computing system 706, database 740, etc., however, this is not intended to be limiting and may still refer to any number of such elements.

The user device 702 may be any type of device, such as an e-reader, personal assistant device, speaker, gaming console, smartphone, desktop computer, laptop computer, tablet, smart television (for example, a television with Internet connectivity, the capability to install applications, etc.), and/or any other type of device. In some instances, the user device 702 may be the client device on which an application 703 runs. Although the figure only shows one application 703, as previously indicated, there may be any number of different types of applications running on different client devices (or some client devices may be running the same application). Further, although the application 703 is shown as being provided at the user device 702, this is not necessarily intended to be limiting. For example, the application 703 may also be stored on a remote server and the user 701 may access the application 703 using the user device 702 without the application 703 executing on the user device 702 itself.

The application 703 may be the frontend application that allows the user 701 to interact with the content management system 708. In some instances, the application 703 may present a user interface that allows the user 701 to create and manage content to be published. For example, the application 703 may allow the user 701 to generate fields, models, model sets, and/or perform any other tasks associated with generating content using the content management system 708. The application 703 may also allow the user 701 or another user to access the published content.

The computing system 706 may be a remote system (such as servers or any other systems with processing capabilities) that hosts the content management system 708 and any of the elements that make up the content management system 708. In the example shown in FIG. 7, first content 710 and second content 722 are published via the content management system 708. The first content 710 and the second content 722 may be viewable by the user 701 via the application 703.

The first content 710 is shown as being associated with a first model set 712. The first model set 712 includes a first model 714 and a second model 718. The first model 714 is shown as including a first field 716 and the second model 718 is shown as including a second field. Likewise, the second content 722 includes the first model 714 and a third model 730. The first model 714 is again shown as including the first field 716 and the third model 730 is shown as including a third field 732. The number of models included in the first model set 712 and the second model set 724 and the number of fields included in each of the models is merely exemplary and not intended to be limiting.

The content management system 708 shown in FIG. 7 illustrates that different model sets may include different combinations of models, however, one or more of the models in each of the model sets may be the same. That is, one particular model may be leveraged in multiple different model sets. However, in some cases, two model sets may include entirely distinct models.

The models sets (for example, first model set 712 and second model set 724, as well as any other model sets) are entities that aggregate one or more models into a single comprehensive schema for specific content types. Models may be referenced and reusable across model sets. Content entities (for example, first content 710 and second content 722) which define fields may be created using these model sets. A type of field entity, which may be called a "content reference" field type, may be created by defining a reference to a model set. Content entities can use this field type to reference other types of content using the same or different model sets. Collectively, the combination of model sets and system models enables a system where users can create flexibly typed content and dynamically enable processes within that system for both new and existing content.

The models (for example, first model 714, second model 718, and third model 730, as well as any other models) aggregate various user and system defined fields. The models may include various types of models. For example, as shown in FIGS. 2A-2B, three different types of exemplary models may exist, including: metadata models, content models, and system models. Metadata models may include a collection of fields that define properties and attributes associated with content (non-limiting examples of content include a news article, a frequently-asked questions (FAQ) page, a description of a building, a legal policy document, and/or any other types of content that may be published). Content models may define fields that are user-readable within the content. System models encapsulate system defined fields that are associated with processes, such as translations or publication workflows within the content management system (this is elaborated on in more detail later). These system models may be referenced by system model identifiers.

At the smallest unit, fields (for example, first field 716, second field, third field 732, and/or any other number of fields) define the properties of data elements, including details such as identifiers, version numbers, labels, data types (number, string, rich text, etc.), validations, etc. Validations may refer to conditions that may be required for certain types of fields. For example, a maximum character limit of 50 characters may be imposed on a particular type of field. As another example, another type of field may require only numerical values. Fields may be defined by the system or by users at runtime (runtime may refer to the instance in which the user is interacting with the content management system, for example).

In one or more embodiments, any of the elements of the system 700 (for example, one or more user devices 702, computing system 706, database 740, and/or any other element described with respect to FIG. 7 or otherwise) may be configured to communicate via a communications network 750. The communications network 750 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 750 may have any suitable communication range associated therewith and may include, for example, global networks (e.g., the Internet), metropolitan area networks (MANs), wide area networks (WANs), local area networks (LANs), or personal area networks (PANs). In addition, communications network 750 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Finally, any of the elements (for example, user device 702, computing system 706, database 712, and/or any other element described with respect to FIG. 7 or otherwise) of the system 700 may include any of the elements of the computing device 800 as well (such as the processor 802, memory 804, etc.).

Figure 8:
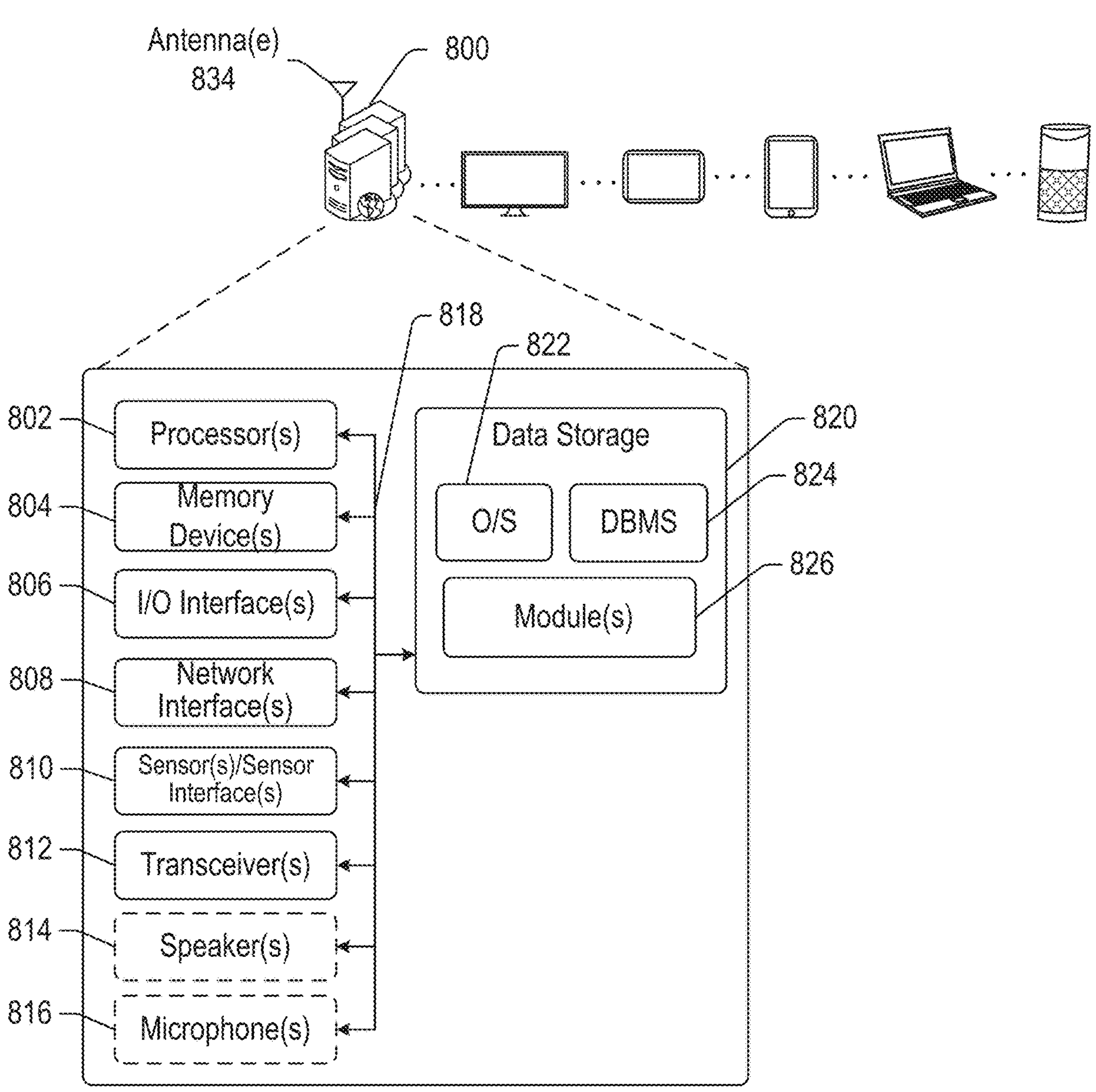
FIG. 8 depicts an example computing device, in accordance with one or more example embodiments of the disclosure

FIG. 8 is a schematic block diagram of an illustrative computing device 800 in accordance with one or more example embodiments of the disclosure. The computing device 800 may include any suitable computing device capable of receiving and/or generating data including, but not limited to, a user device such as a smartphone, tablet, e-reader, wearable device, or the like; a desktop computer; a laptop computer; a content streaming device; a set-top box; or the like. The computing device 800 may correspond to an illustrative device configuration for the devices of FIGS. 1-7 (such as user device 702, computing systems 704 and/or 708, unified registry 712, etc.).

The computing device 800 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 800 may include one or more processors (processor(s)) 802, one or more memory devices 804 (generically referred to herein as memory 804), one or more input/output (I/O) interface(s) 806, one or more network interface(s) 808, one or more sensors or sensor interface(s) 810, one or more transceivers 812, one or more optional speakers 814, one or more optional microphones 816, and data storage 820. The computing device 800 may further include one or more buses 818 that functionally couple various components of the computing device 800. The computing device 800 may further include one or more antenna (e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit exchange of information (e.g., data (including computer-executable code), signaling, etc.) between various components of the computing device 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 804 of the computing device 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to memory 804 for use by the processor(s) 802 during the execution of the computer-executable instructions. Moreover, output data generated as a result of execution of the computer-executable instructions by the processor(s) 802 may be stored initially in memory 804, and may ultimately be copied to data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like such as, for example, one or more module(s) 826. Any of the components depicted as being stored in data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in data storage 820 may support functionality described in reference to correspondingly named components earlier in this disclosure.

The data storage 820 may further store various types of data utilized by components of the computing device 800. Any data storage in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, the datastore(s) may include any of the data that is described as being stored in database 712 in FIG. 7, as well as any other data that is described herein.

The processor(s) 802 may be configured to access the memory 804 and execute computer-executable instructions loaded therein. For example, the processor(s) 802 may be configured to execute computer-executable instructions of the various program module(s), applications, engines, or the like of the computing device 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the module(s) 826 may include computer-executable instructions, code, or the like that responsive to execution by one or more of the processor(s) 802 may perform functions including, but not limited to, automatically onboarding new applications using the unified registry, automatically tracking updates to services and other elements that are used by an application, and/or any other processes described herein.

Referring now to other illustrative components depicted as being stored in the data storage 820, the O/S 822 may be loaded from the data storage 820 into the memory 804 and may provide an interface between other application software executing on the computing device 800 and hardware resources of the computing device 800. More specifically, the O/S 822 may include a set of computer-executable instructions for managing hardware resources of the computing device 800 and for providing common services to other application programs (e.g., managing memory allocation among various application programs). In certain example embodiments, the O/S 822 may control execution of the other program module(s) to dynamically enhance characters for content rendering. The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data storaged in the memory 804 and/or data storaged in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 800 is a user device, the DBMS 824 may be any suitable light-weight DBMS optimized for performance on a user device.

Referring now to other illustrative components of the computing device 800, the input/output (I/O) interface(s) 806 may facilitate the receipt of input information by the computing device 800 from one or more I/O devices as well as the output of information from the computing device 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna (e) 834 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 800 may further include one or more network interface(s) 808 via which the computing device 800 may communicate with any of a variety of other systems, platforms, networks, devices, and so forth. The network interface(s) 808 may enable communication, for example, with one or more wireless routers, one or more host servers, one or more web servers, and the like via one or more of networks.

The antenna (e) 834 may include any suitable type of antenna depending, for example, on the communications protocols used to transmit or receive signals via the antenna (e) 834. Non-limiting examples of suitable antennas may include directional antennas, non-directional antennas, dipole antennas, folded dipole antennas, patch antennas, multiple-input multiple-output (MIMO) antennas, or the like. The antenna (e) 834 may be communicatively coupled to one or more transceivers 812 or radio components to which or from which signals may be transmitted or received.

As previously described, the antenna (e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna (e) 834 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna (e) 834 may be configured to transmit or receive radio frequency signals within any suitable frequency range forming part of the unlicensed portion of the radio spectrum.

The antenna (e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna (e) 834—transmitting or receiving radio frequency (RF) signals in the bandwidth and/or channels corresponding to the communications protocols utilized by the computing device 800 to communicate with other devices. The transceiver(s) 812 may include hardware, software, and/or firmware for modulating, transmitting, or receiving-potentially in cooperation with any of antenna (e) 834—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computing device 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 814 may be any device configured to generate audible sound. The optional microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module (s) depicted in FIG. 8 may be implemented, at least partially, in hardware and/or firmware across any number of devices.

It should further be appreciated that the computing device 800 may include alternate and/or additional hardware, software, or firmware components beyond those described or depicted without departing from the scope of the disclosure. More particularly, it should be appreciated that software, firmware, or hardware components depicted as forming part of the computing device 800 are merely illustrative and that some components may not be present or additional components may be provided in various embodiments. While various illustrative program module(s) have been depicted and described as software module(s) stored in data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A content management system comprising:

memory that stores computer-executable instructions; and one or more processors configured to access the memory and execute the computer-executable instructions to:

generate, by the content management system and based on a first input to a user interface of the content management system, a first field entity including at least one of: an identifier, a data type, or a validation;

store the first field entity in the content management system;

generate, by the content management system and based on a second input to a user interface of the content management system, a first model entity and a second model entity that reference the first field entity, wherein the first model entity and the second model entity include at least one of: a system model, a metadata model, and a content model, wherein the system model includes fields associated with automated workflows performed by the content management system, wherein the metadata model includes fields defining properties and attributes associated with content, and the content model includes fields that are readable within first content;

store the first model entity and the second model entity in the content management system, wherein the first model entity and the second model entity are stored as reusable entities that are referenceable across different model sets;

generate, by the content management system and based on a third input to a user interface of the content management system, a first model set referencing the first model entity and the second model entity;

receive, by the content management system and via the user interface, a first request to publish first content, the first request indicating that the first model set is to be used with the first content;

receive, by the content management system and via the user interface, a second request to publish second content, the second request including a selection of at least one of: the first model set, the first model entity, or the first field entity via the user interface;

publish the first content via the content management system, wherein the first content is presented via the user interface of the content management system; and publish the second content via the content management system leveraging the at least one of the: first model set, the first model entity, or the first field entity stored in the content management system by reference rather than re-generating the at least one of the: first model set, the first model entity, or the first field entity for the second content, wherein the second content is presented via the user interface of the content management system.

2. The content management system of claim 1, wherein the first field entity is associated with a first version, wherein the content management system further comprises a second field entity, wherein the second field entity is associated with a second version, wherein the first field entity and second field entity include a same identifier, and wherein the first field entity and second field entity include a different data type or validation.

3. The content management system of claim 2, wherein the first field entity and the second field entity are associated with a first key, and wherein the first field entity is also associated with a second key and the second field entity is also associated with a third key.

4. A content management system comprising:

memory that stores computer-executable instructions; and one or more processors configured to access the memory and execute the computer-executable instructions to:

generate, by the content management system and based on a first input to a user interface of the content management system, a first field entity including at least one of: an identifier, a data type, or a validation;

store the first field entity in the content management system;

generate, by the content management system and based on a second input to the user interface of the content management system, a first model entity and a second model entity that reference the first field entity;

generate, by the content management system and based on a third input to the user interface of the content management system, a first model set including the first model entity and the second model entity;

store the first model entity and the second model entity in the content management system, wherein the first model entity and the second model entity are stored as reusable entities that are referenceable across different model sets;

receive, by the content management system and via the user interface, a first request to publish first content, the first request indicating that the first model set is to be used with the first content;

receive, by the content management system and via the user interface, a second request to publish second content, the second request including a selection of at least one of: the first model set, the first model entity, or the first field entity via the user interface;

publish the first content via the content management system, wherein the first content is presented via the user interface of the content management system; and publish the second content via the content management system leveraging the at least one of the: first model set, the first model entity, or the first field entity stored in the content management system rather than re-generating the at least one of the: first model set, the first model entity, or the first field entity for the second content, wherein the second content is presented via the user interface of the content management system.

5. The content management system of claim 4, wherein the one or more processors are further configured to execute the computer-executable instructions to:

generate a second model set including the first model entity and a third model entity without the second model entity;

publish second content via the content management system, wherein the second content is based on the second model set, wherein the second content includes a reference to the second model entity;

determine, by the content management system that the second content includes the reference to the second model entity; and automatically inherit, by the second content, at least one of: a feature or a field of the second model entity based on the reference without the second content including the second model entity.

6. The content management system of claim 4, wherein the first model entity and the second model entity are different types of models.

7. The content management system of claim 6, wherein the first model entity and the second model entity includes at least one of: a system model, a metadata model, or a content model, wherein the system model includes fields associated with automated workflows performed by the content management system, wherein the metadata model include fields defining properties and attributes associated with the first content, and the content model includes fields that are readable within the first content.

8. The content management system of claim 4, wherein the first field entity is associated with a first version, wherein the content management system further comprises a second field entity, wherein the second field entity is associated with a second version, wherein the first field entity and second field entity include a same identifier, and wherein the first field entity and second field entity include a different data type or validation.

9. The content management system of claim 8, wherein the first field entity and the second field entity are associated with a first key, and wherein the first field entity is also associated with a second key and the second field entity is also associated with a third key.

10. The content management system of claim 4, wherein the one or more processors are further configured to execute the computer-executable instructions to:

generate, based on an action associated with the first content, an event;

determine that a model associated with a feature for the first content is included in the first model set; and perform an automated workflow associated with the feature based on the determination that the model associated with a feature for the first content is included in the first model set.

11. A method comprising:

generating, by a content management system and based on a first input to a user interface of the content management system, a first field entity including at least one of: an identifier, a data type, or a validation;

storing the first field entity in the content management system;

generating, by the content management system and based on a second input to a user interface of the content management system, a first model entity and a second model entity that reference the first field entity;

storing the first model entity and the second model entity in the content management system, wherein the first model entity and the second model entity are stored as reusable entities that are referenceable across different model sets;

generating, by the content management system and based on a third input to a user interface of the content management system, a first model set referencing the first model entity and the second model entity;

receiving, via a user interface of the content management system, a first request to publish first content, the first request indicating that the first model set is to be used with the first content;

receiving, by the content management system and via the user interface, a second request to publish second content, the second request including a selection of at least one of: the first model set, the first model entity, or the first field entity via the user interface;

publishing, by the content management system, the first content, wherein the first content is presented via the user interface of the content management system; and publishing the second content via the content management system leveraging the at least one of the: first model set, the first model entity, or the first field entity stored in the content management system rather than re-generating the at least one of the: first model set, the first model entity, or the first field entity for the second content, wherein the second content is presented via the user interface of the content management system.

12. The method of claim 11, wherein the first model entity and the second model entity are different types of models.

13. The method of claim 12, wherein the first model entity and the second model entity includes at least one of: a system model, a metadata model, or a content model, wherein the system model includes fields associated with automated workflows performed by the content management system, wherein the metadata model include fields defining properties and attributes associated with the first content, and the content model includes fields that are readable within the first content.

14. The method of claim 11, wherein the first field entity is associated with a first version, wherein the content management system further comprises a second field entity, wherein the second field entity is associated with a second version, wherein the first field entity and second field entity include a same identifier, and wherein the first field entity and second field entity include a different data type or validation.

15. The method of claim 14, wherein the first field entity and the second field entity are associated with a first key, and wherein the first field entity is also associated with a second key and the second field entity is also associated with a third key.

16. The method of claim 11, further comprising:

generating, based on an action associated with the first content, an event;

determining that a model associated with a feature for the first content is included in the first model set; and performing an automated workflow associated with the feature based on the determination that the model associated with a feature for the first content is included in the first model set.

* * * * *